3,497,425
ELECTRODES AND METHODS OF MAKING SAME
Joseph Bernard Cotton, Little Aston, and Peter Charles Steele Hayfield, Castle Bromwich, England, assignors to Imperial Metal Industries (Kynoch) Limited, London, England, a corporation of Great Britain
No Drawing. Filed July 15, 1965, Ser. No. 472,318
Claims priority, application Great Britain, July 20, 1964, 29,455/64
Int. Cl. C23b 5/52, 5/50; B01k 3/04
U.S. Cl. 204—37     5 Claims

ABSTRACT OF THE DISCLOSURE

There is provided a process for making electrodes having a rough or porous surface which includes coating the core of an electrode with a relatively insoluble metal and a more easily soluble metal and subsequently removing the more soluble metal. Preferably the relatively insoluble metal is first coated on the core and with or without the second coating of the more soluble metal. The so-coated core is heat treated to diffuse the relatively insoluble metal at least partly into the core before removing the more soluble metal.

---

This invention relates to electrodes and especially to electrodes having a coating of a platinum group metal over a core of another metal and to a method of preparing such electrodes. One example of the kind of electrode to which the invention relates has a core of titanium and a coating of a platinum group metal. Within the term "titanium" we wish to include titanium-base alloys having anodic polarisation properties similar to those of pure titanium. Within the term "platinum group metal" we wish to include platinum, rhodium, iridium, osmium, ruthenium and alloys therebetween.

It is known that the overvoltage observed with such electrodes when used in the production of gases such as oxygen and chlorine, for example, can be lowered by increasing the roughness or porosity of the coating. This is thought to be due to an increase in true surface area. The present invention provides a method of producing coatings of relatively large true surface area having low overvoltage.

Accordingly, the present invention provides a method of making an electrode comprising forming a fine scale mixture containing a relatively insoluble metal which forms part of the electrode and a more easily soluble metal over the surface region of the electrode and subsequently dissolving out the more easily soluble metal. One example of a relatively insoluble metal is one selected from the platinum group which may be in the form of a coating over a core of another metal and in this case the invention provides a method of making an electrode having a coating of platinum group metal over a core of another metal comprising the steps of forming on the core an adherent coating containing a fine scale mixture of the platinum group metal and a more easily dissolvable metal and subsequently dissolving out the more easily dissolvable metal from the coating. Within the term "fine scale mixture" we wish to include alloys and interdiffused regions between metals. The invention is especially applicable when the core metal is titanium as hereinbefore defined and the core metal must be resistant to attack by the electrolyte in use, since the coating will normally be porous.

The more easily dissolvable metal may be diffused into the platinum group metal by heating. One example of a more easily dissolvable metal is copper. According to one form of the invention a separate coating of a platinum group metal is formed on a core metal first, followed by a coating of a more easily dissolvable metal, the double coated core being heat-treated to form a fine scale mixture by inter-diffusion of the coating metals.

Adhesion between the platinum group metal and the core metal may be increased by heating to diffuse the platinum group metal into the core metal. This treatment may be performed at the same time as the heat-treatment for inter-diffusion of the platinum group metal and the more easily dissolvable metal, but optimum conditions of final overpotential and physical robustness are obtained by separate heat-treatments. The bonding heat-treatment should be sufficient to cause inter-diffusion between the platinum group metal and the core metal over a range of at least 5 microns, but not such as to form massive and brittle inter-metallic compounds. A preferred bonding heat-treatment comprises heating at 780° C. for a period up to 15 minutes either in vacuo or in an inert atmosphere, but bonding may also be effected by longer times of heating at lower temperatures, e.g. of the order of 50–60 hours at temperatures down to 450° C., or for very short intervals, periods of no more than minutes, at temperatures up to 1000° C. Heat-treatment conditions for inter-diffusion of platinum and dissolvable metal are dependent upon relative inter-diffusion rates.

For copper electrodeposited on platinum optimum conditions for producing robust low over-potential surfaces are within the range 1 minute to several hours at temperatures of 300° C. to 600° C., with a preferred treatment of ½ hour at 500° C., but treatments at temperatures up to and including 800° C. are also acceptable.

The coatings may be formed in a variety of ways, including electrodeposition, dipping in a molten metal bath and metal spraying.

The more easily dissolvable metal can be dissolved in a variety of ways, for example, electrolytically or by chemical means.

The invention also provides an electrode having a coating of a platinum group metal over a core of another metal which is unattacked by the intended electrolyte, the porosity of the coating having been increased by a method according to the present invention and as previously described. Examples of the invention will now be described:

EXAMPLE I

Titanium plate of grain size 0.02–0.03 mm. was etched in concentrated hydrochloric acid at 25° C. for three days. At the end of this immersion period the surface was scrubbed with an abrasive powder. The sample was then coated with platinum by electroplating in a plating bath containing sodium hexahydroxy platinate, $Na_2Pt(OH)_6$—20 g./litre, sodium hydroxide—2–10 g./litre.

After the noble metal plating, the sample was heated in vacuo for 20 minutes at 780° C. Adhesion of the platinum was assessed by making the sample cathodic in 10% sodium bisulphate at 100° C. and saturated with hydrogen sulphide. Platinised titanium prepared without the heat-treatment failed by removal of platinum at a current density of 500 amp/ft.$^2$ after ½ hour, whereas heat-bonded material was still satisfactory after 200 hours.

The sample was then further coated with cooper to a thickness of about 10 microns and heated under vacuo for 1 hour at 500° C. Subsequently, copper was leached from the surface by immersion in 50% nitric acid at room temperature. Adhesion of the platinum was determined by making the sample cathodic in 10% sulphuric acid at 100° C. at a current density of 1000 amp/ft.$^2$. Platinised titanium prepared without heat-treatment and titanium coated with platinum by means of organic paints, all failed within ½ hour when subjected to the cathodic test in sulphuric acid previously described. The sample prepared according to the invention lasted for three hours.

EXAMPLE II

Titanium plate of grain size 0.02–0.03 mm. was etched in concentrated hydrochloric acid at 25° C. for three days. At the end of this immersion period the surface was scrubbed with an abrasive powder. The sample was then coated with platinum by electroplating in a plating bath containing sodium hexahydroxy platinate $Na_2Pt(OH)_6$—20 g./litre sodium hydroxide—2–10 g./litre.

After the noble metal coating had been deposited the sample was next coated with electrodeposited copper to a thickness of about 10 microns. Interdiffusion of the copper into the noble metal coating, and the coating into the titanium, was achieved by heating under vacuo at 800° C. for one hour. Finally copper was removed from the surface by making it the positive electrode in a molal sulphuric acid solution at a direct current density of about 10 ma./cm.$^2$. When no more copper would dissolve, the electrode was washed and dried, and was grey in colour. The results of several real surface area determinations, based upon double layer capacitance measurements in molal sulphuric acid, are given in Table I. Oxygen overpotentials were measured in 1 molal sulphuric acid at an apparent current density of 10 amps/m.$^2$.

TABLE I

| Description of sample | Capacitance $\mu F$./geometric cm.$^2$ | Roughness | Oxygen overpotentials (volts) |
| --- | --- | --- | --- |
| Smooth platinum wire | 36.4 | 2.0 | 0.80 |
| Plated platinum on etched titanium | 78.1 | 4.3 | 0.71 |
| Platinum black | 2,420 | 133 | 0.55 |
| Spongy platinum on titanium prepared as in Example I | 49,800 | 2,740 | 0.38 |

EXAMPLE III

Samples of titanium were electrolytically plated with platinum according to the procedure given in Example I. At this stage in preparation samples were electrolytically plated with copper to a thickness of 5 microns and heat-treated under vacuo at temperatures ranging from 400 to 800° C. After dissolution of copper in 50% nitric acid, samples were made anodic in 22% by weight sodium chloride at 70° C. at a current density of 3.0 kiloamp/m.$^2$. Chlorine overvoltages were measured after 15 minutes of this treatment, see Table II.

TABLE II

| Temperature of copper diffusion into the platinum (in millivolts) | 400° C. | 500° C. | 600° C. | 700° C. | 750° C. | 780° C. |
| --- | --- | --- | --- | --- | --- | --- |
| Chlorine overpotential at 1.67 kiloamp/m.$^2$ | 25 | 5 | 15 | 65 | 195 | 285 |
| Chlorine overpotential at 16.7 kiloamp/m.$^2$ | 75 | 35 | 45 | 165 | 245 | 495 |

EXAMPLE IV

Samples of commercial purity titanium of grain size 0.03–0.05 mm. were electroplated with platinum to a thickness of 2.5 microns, and then electroplated with copper to a thickness of about 5 microns. After heating in an atmosphere of argon for ½ hour at 500° C. to form a fine scale mixture of platinum and copper, the copper was removed from the mixture anodically in molal sulphuric acid. When no more copper would dissolve, the coated samples were washed and dried. Subsequently a number of coated samples were heat-treated in air for 60 hours at 450° C. To assess wear resistance of the platinum surfaces, samples with and without the final heat-treatment were made anodic at 1000 amp/ft.$^2$ (geometric surface area) in 5 litre beakers of saturated sodium chloride. At weekly intervals the adhesion of the platinum was assessed by means of a stripping test. In this test a strip of pressure-sensitive adhesive tape is pressed on to the coated surface so that no air remains, and the tape is then removed in a single sharp movement. Over a period of several weeks, the stripping test removed less platinum from the samples which had received the final heat-treatment, indicating that they possessed enhanced wear resistance.

The invention is not limited to the examples given and the following variations are possible, for example:

(a) The more easily dissolvable metal may be silver, nickel, tin, etc. or alloys therebetween, (b) The coating process may comprise vacuum evaporation or chemical reduction, dipping, etc., (c) Other methods of hot deposition of the more easily dissolvable metal include pack treatment in the metal powder, etc., (d) The order of deposition of the coatings can be varied; co-deposition may be employed, for example, (e) The method can be applied to solid electrodes of platinum or other metals such as nickel. When it is applied to platinum, it provides a convenient method of producing a coating of "platinum black."

We claim:

1. A method of making electrolytic electrodes having a core of a first metal and a rough or porous coating of a second metal thereon which electrode provides enlarged surface areas and low overvoltages in use, comprising placing on a core of a metal selected from the group consisting of titanium and titanium-base alloys having anodic polarization properties similar to those of pure titanium a first coating of a relatively insoluble metal selected from the platinum group metals, which metal is the one intended to form the rough or porous coating, and subsequently placing on said first coating a second coating of copper which is a more easily soluble metal, diffusing the coating by heat treating at 300° to 800° C. for at least one minute and subsequently dissolving out the more easily soluble metal.

2. A method according to claim 1 wherein the heat treatment comprises heating at 780° C. for up to 15 minutes.

3. A method according to claim 1 wherein at least one of the metals is coated on the core metal electrolytically.

4. A method according to claim 1 wherein the more easily soluble metal copper is dissolved electrolytically.

5. A method according to claim 1 wherein the step of dissolving out the more easily soluble metal is carried out until substantially no additional more easily soluble metal will dissolve.

References Cited

UNITED STATES PATENTS

| | | | |
| --- | --- | --- | --- |
| 3,396,091 | 8/1968 | Lyons et al. | 204—11 |
| 3,354,060 | 11/1967 | Carl | 204—35 |
| 2,719,797 | 10/1955 | Rosenblatt et al. | 117—65 |
| 3,055,811 | 9/1962 | Ruff | 204—128 |
| 3,097,149 | 7/1963 | Lacroix | 204—146 |
| 3,103,484 | 9/1963 | Messner | 204—290 |
| 3,234,110 | 2/1966 | Beer | 204—38 |
| 3,254,015 | 5/1966 | Steele | 204—290 |
| 3,364,018 | 1/1968 | Kirkpatrick | 156—2 XR |
| 3,272,728 | 9/1966 | Hahndorff et al. | 204—35 |
| 3,305,457 | 2/1967 | Hyman | 204—47 XR |
| 3,340,097 | 9/1967 | Hess et al. | 204—47 XR |

FOREIGN PATENTS

| | | |
| --- | --- | --- |
| 592,130 | 2/1934 | Germany. |
| 215,847 | 2/1957 | Australia. |
| 1,065,821 | 9/1959 | Germany. |
| 874,953 | 8/1961 | Great Britain. |

JOHN H. MACK, Primary Examiner

W. B. VANSISE, Assistant Examiner

U.S. Cl. X.R.

29—529; 117—62, 230; 204—11, 24, 141, 290